United States Patent [19]

Jeppesen

[11] Patent Number: 4,924,387

[45] Date of Patent: May 8, 1990

[54] COMPUTERIZED COURT REPORTING SYSTEM

[76] Inventor: John C. Jeppesen, 82209 Edison, Ventura, Calif. 93001

[21] Appl. No.: 211,826

[22] Filed: Jun. 20, 1988

[51] Int. Cl.⁵ ............................................. G11B 15/10
[52] U.S. Cl. .................................. 364/409; 360/33.1; 360/13
[58] Field of Search .............. 364/409; 360/33.1, 14.1, 360/13, 14.2, 14.3; 369/69

[56] References Cited

U.S. PATENT DOCUMENTS

| | | | |
|---|---|---|---|
| 3,879,751 | 4/1975 | Gimelli | 360/31 |
| 3,905,042 | 9/1975 | Johnson | 360/71 |
| 3,990,710 | 11/1976 | Hughes | 360/29 |
| 4,641,203 | 2/1987 | Muller | 360/33.1 |

*Primary Examiner*—Jerry Smith
*Assistant Examiner*—Kim Thanh T. Bui
*Attorney, Agent, or Firm*—Donald A. Streck

[57] ABSTRACT

A court reporting system for providing a simultaneous written and video record under the control of a single court reporter. A court reporter's keyboard stenographic accepts inputs from the reporter and provides a signal reflecting keystroke combinations input by the reporter. A system clock provides the current time and date. There is a memory for receiving and storing signal sequences reflecting keystroke combinations and a table for defining keystroke combinations as control strokes. A video camera provides a video signal reflecting a viewed scene and a microphone provides an audio signal reflecting verbal testimony. A recorder is connected to the video camera and the microphone for producing a recording of testimony in progress. Finally, ther is a control system connected to the above elements including logic for separating keystroke combinations into phonetic keystrokes and control keystrokes, for recording the phonetic keystrokes in the memory, for periodically obtaining the current time and date from the clock and appending it to the recording of the video and audio and the signal reflecting keystroke combinations stored in the memory. The system provides an alarm when the stroke rate is over a safe limit for accurate recording or when more than one person speaks. Synthesized messages place the system on and off the rocord. provision is made for flagging, searching and correcting questionable words and for reminding the reporter to do so. The system can place the video and stroke records in synchronization for review and confirmation. The preferred system adjusts camera position and zoom for better video quality.

25 Claims, 5 Drawing Sheets

COMPUTERIZED COURT REPORTING SYSTEM

BACKGROUND OF THE INVENTION:

This invention relates to court reporting systems whereby the testimony of individuals is recorded and, more particularly, to a court reporting system for providing a simultaneous written and video record under the control of a single court reporter comprising, a court reporter's stenographic recording input device having a keyboard for accepting phonetic keystroke combination manual inputs from the court reporter and for providing a corresponding signal reflecting keystroke combinations input by the court reporter at an output thereof; system clock means for providing a current time and date signal at an output thereof; stroke record memory means for receiving and storing a sequence of the signal reflecting keystroke combinations input by the court reporter; stroke table means for defining a plurality of keystroke combinations not employed for phonetic representations as control strokes; video camera means for viewing a scene and providing a video signal reflecting the scene at an output thereof; microphone means for providing an audio signal reflecting verbal testimony at an output thereof; recorder means connected to the outputs of the video camera means and the microphone means for producing a recording of the video and audio signals reflecting testimony in progress; and, control means operably connected to the outputs of the court reporter's stenographic recording input device, the system clock means, the video camera means, and the microphone means and the stroke table means and the recorder means and the stroke record memory means for separating keystroke combinations input by the court reporter into phonetic keystrokes and control keystrokes, for recording the phonetic keystrokes in the stroke record memory means, for periodically obtaining the current time and date signal from the system clock means and appending it to the recording of the video and audio signals and the sequence of the signal reflecting keystroke combinations stored in the stroke record memory means.

The providing of an accurate record of testimony of witnesses in depositions, court proceedings, and the like, is a long felt problem. At first, and for a long time, court reporters who were proficient in the taking and transcribing of shorthand notes attempted to record the proceedings to the best of their ability. As anyone who has had the opportunity to be involved with the process knows, manual recording and transcription of a multiparty proceedings is stressful and difficult for the court reporter. The reporter is required to record, by means of a series of drawn symbols or "strokes", the phonetic representation of what is heard and the source thereof. Mumbling, nodding or shaking of the head in lieu of speech, talking at high rates of speed, and talking by more than one individual at a time makes the job more difficult and, in many instances, impossible. Where the written record is inaccurate, there is no way to correct it. If a key point of law or fact occurs at that point in the proceedings, major consequences may follow from the ability to prove what, in fact, happened at the time from the certified transcript provided by the court reporter.

Figure 1:
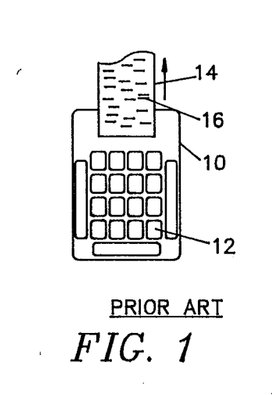
FIG. 1 is a drawing depicting a prior art court reporter's stenographic machine.

A major step forward in assistance to court reporters came some time back with the invention and introduction of the stenographic machine 10 of FIG. 1. The machine 10 has a series of buttons 12 which, when pushed in combination, produce mechanically generated strokes 16 on a paper tape 14. Like their written counterpart, the strokes 16 are used to indicate a phonetic representation of what is heard and the source thereof. Working with a stenographic machine 10, a court reporter could produce a more consistent stroke record of the testimony. This made it easier to avoid mistakes since a wiggle or bend in the written record could change the phonetic representation. Likewise, when and if necessary, others could transcribe the record from a stenographic machine 10 whereas the written record of each court reporter tended to be individualized to the point that in some cases where the original reporter had died without transcribing the notes, it was impossible for another reporter to do the job. Other than that, the stenographic machine 10 did nothing to change the problems of court reporting. Mumbling, nodding or shaking of the head in lieu of speech, talking at high rates of speed, and talking by more than one individual at a time still made the job more difficult and, in many instances, impossible.

Figure 2:
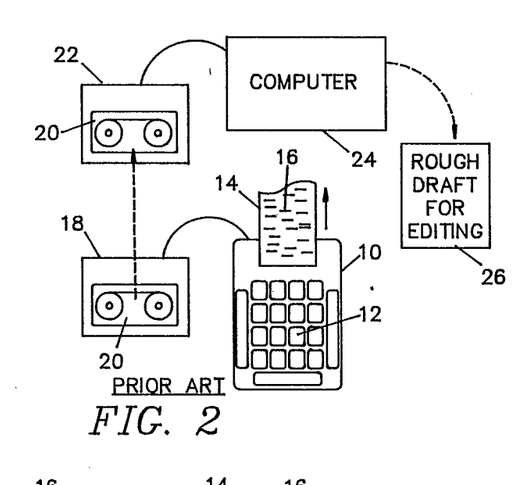
FIG. 2 is a drawing depicting a prior art court reporting system wherein the strokes input on the court reporter's stenographic machine of FIG. 1 are recorded on magnetic tape for later off-line input to a computer for generation by the computer of a rough draft document for editing by the court reporter.
Figure 3:
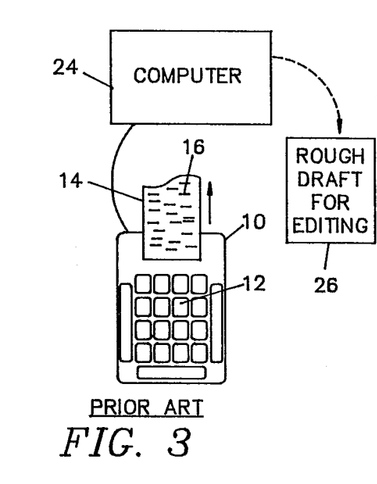
FIG. 3 is a drawing depicting a prior art court reporting system wherein the strokes input on the court reporter's stenographic machine of FIG. 1 are simultaneously input to a computer for instant generation by the computer of a rough draft document for editing by the court reporter.

More recently, with the general availability of computers for personal use, computer power has been added to the field of court reporting. At first, as shown in FIG. 2, the stenographic machine 10 was connected to a tape recorder 18 whereby the strokes 16 were simultaneously printed on the paper tape 14 and recorded on a magnetic tape 20. The magnetic tape 20 was then taken to a tape reader 22 connected to a computer 24 where the stroke record on the tape 20 was read into the computer 24. Since the strokes, i.e. the combinations of buttons 12 depressed simultaneously and in sequence, are virtually standardized, the computer 24 is able to generate a rough draft 26 of the transcription in word processing format for later editing by the court reporter. At present, in many cases such as in courthouse environments, the recorder 18 and reader 22 are replaced by a direct connection between the stenographic machine 10 and the computer 24 such that the rough draft 26 is produced on a real-time basis. This is a real boon in those instances where the court reporter is required to produce "dailys", i.e. a written record of the day's testimony at the end of each day. Note, however, that the problems of mumbling, nodding or shaking of the head in lieu of speech, talking at high rates of speed, and talking by more than one individual at a time still exist in this "high tech" system.

Figure 4:
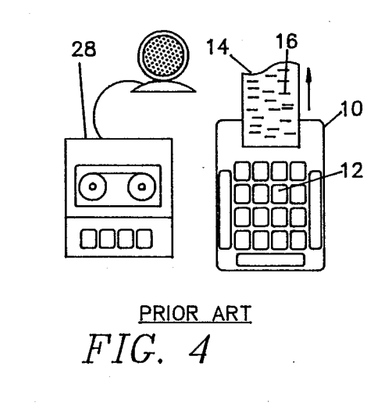
FIG. 4 is a drawing depicting a prior art court reporting system wherein a voice recording of the testimony is made simultaneously with the use of the court reporter's stenographic machine so that, in case of doubt, the testimony can be replayed to verify the stenographic record and transcription thereof.

Attempts at solving these latter problems have been attempted in the prior art. Thus, as depicted in FIG. 4, many court reporters have employed a voice tape recorder 28 simultaneously with their stenographic machine 10. If in doubt when transcribing the record on the paper tape 14, the reporter can play the recorded voice record from the recorder 28 in an attempt to clarify the phonetic record. This can prove difficult and time consuming since there is no correlation between the paper tape 14 and the voice recording, and testimony can go on for hours. Moreover, the court reporter can have problems trying to operate the voice tape recorder 28 simultaneously with the stenographic machine 10. Typical cassettes as employed in the recorders 28 only have a thirty minute average capacity. Thus, the court reporter may be forced to deal with an end-of-tape situation right in the middle of critical testimony.

Figure 5:
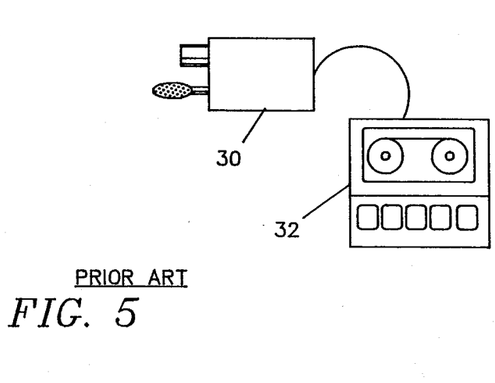
FIG. 5 is a drawing depicting a prior art court reporting system wherein a video recording of the testimony is made by a second individual simultaneously with the use of the court reporter's stenographic machine by a first individual.

A very recent introduction into the field of court reporting is the videotaping of the testimony in the manner depicted in FIG. 5. This, of course, not only provides a supplemental voice record of the testimony but a visual record as well whereby nodding or shaking of the head, hand gestures, etc. in lieu of speech, as well as the demeanor of the witness, can be ascertained at a later time. As presently implemented, two individuals are involved — the court reporter operating the stenographic machine 10 and a video operator operating the video camera 30 and video cassette recorder (VCR) 32. This arrangement is unfortunate to say the least. Of necessity in such situations, there can be only a minimum of, cooperation or interaction between the court reporter and the video operator. While the court reporter is responsible for producing the certified written record, the video operator is the more visible and, therefore, often controls the process by default. Since the two individuals typically work for different entities, the voice/video record made at the time is not available for the court reporter for verification purposes in producing the written transcription. More likely, like the "instant replay" in sports, it is employed to discredit a best effort under the circumstances. Moreover, since two individuals are required and video operators demand high pay for their efforts, the use of video recording is often rejected on a cost-to-client basis and, where used, can cause hard feelings on the part of the lower-paid, harder-working court reporter who is in a high stress position and responsible for the outcome.

To date and in general, nothing has been done about the problems of testimony at high rates of speed and talking by more than one individual at a time. Unless one of the attorneys involved and interested in preserving the record notes the problem and halts the testimony for the benefit of the court reporter, the court reporter generally tries to keep up as best possible until it is beyond the individual's capacity. By the time the court reporter indicates a problem, however, valuable testimony may have been lost or mis-recorded.

Wherefore, it is an object of the present invention to provide a combined mechanical and video court reporting system under the complete control of a single court reporter.

It is a further object of the present invention to provide a combined mechanical and video court reporting system wherein the mechanical and video records are correlated for ease of verification during editing.

It is yet another object of the present invention to provide a combined mechanical and video court reporting system wherein the mechanical and video records are totally controlled from the court reporter's stenographic machine.

It is still another object of the present invention to provide a combined mechanical and video court reporting system wherein the system monitors for conditions that affect the court reporter's ability to make an accurate record of the proceedings and impartially alerts the participants when conditions exceed that ability.

Other objects and benefits of the present invention will become apparent from the description which follows hereinafter when taken in combination with the drawing figures which accompany it.

SUMMARY:

The foregoing objects have been achieved the court reporting system for providing a simultaneous written and video record under the control of a single court reporter of the present invention comprising, a court reporter's stenographic recording input device having a keyboard for accepting phonetic keystroke combination manual inputs from the court reporter and for providing a corresponding signal reflecting keystroke combinations input by the court reporter at an output thereof; system clock means for providing a current time and date signal at an output thereof; stroke record memory means for receiving and storing a sequence of the signal reflecting keystroke combinations input by the court reporter; stroke table means for defining a plurality of keystroke combinations not employed for phonetic representations as control strokes; video camera means for viewing a scene and providing a video signal reflecting the scene at an output thereof; microphone means for providing an audio signal reflecting verbal testimony at an output thereof; recorder means connected to the outputs of the video camera means and the microphone means for producing a recording of the video and audio signals reflecting testimony in progress; and, control means operably connected to the outputs of the court reporter's stenographic recording input device, the system clock means, the video camera means, and the microphone means and the stroke table means and the recorder means and the stroke record memory means for separating keystroke combinations input by the court reporter into phonetic keystrokes and control keystrokes, for recording the phonetic keystrokes in the stroke record memory means, for periodically obtaining the current time and date signal from the system clock means and appending it to the recording of the video and audio signals and the sequence of the signal reflecting keystroke combinations stored in the stroke record memory means.

In the preferred embodiment the invention additionally comprises, alarm means for indicating an alarm condition; stroke times table means for maintaining a history of the times of the most recent strokes input by the court reporter; and, the control means being operably connected to the stroke times table and the alarm means and including means for storing the times of the strokes input by the court reporter in the stroke times table, for periodically calculating a short term running average stroke speed of the court reporter, for comparing the short term running average stroke speed as calculated to an upper safe limit value, and for causing the alarm means to indicate an alarm condition when the short term running average stroke speed exceeds the upper safe limit value. The control means also includes means for the court reporter to set the upper safe limit value and the preferred alarm means comprises a blinking light. Also in the preferred embodiment, the control means includes means for determining if more than one person is speaking at a time during testimony and for causing the alarm means to indicate an alarm condition when more than one person is speaking at a time.

Also in the preferred embodiment, there are message storage means for storing synthesized messages and the control means is operably connected to the message means and includes means for appending the synthesized messages to the recording of the video and audio signals and means for appending a first synthesized message including the current time and date signal from the system clock means to the recording of the video and audio signals in response to a control keystroke from the court reporter indicating the time and date the testimony is going "on the record" and for appending a second synthesized message including the current time and date signal from the system clock means to the recording of the video and audio signals in response to another control keystroke from the court reporter indicating the time and date the testimony is going "off the record".

The preferred control means also includes means for appending a flag to the phonetic keystrokes in the stroke record memory means in response to a control keystroke from the court reporter indicating a word as just recorded phonetically needs clarification, for searching the stroke record memory means for flags when requested by the court reporter, for displaying flagged ones of the phonetic keystrokes in the stroke record memory, for receiving clarification inputs from the court reporter, and for correcting the flagged ones of the phonetic keystrokes in the stroke record memory with the clarification inputs from the court reporter as well as means for automatically searching the stroke record memory means for flags at the end of a recording session and for advising the court reporter that there are words needing clarification if any the flags are found.

For editing and verification purposes, the preferred control means includes means for obtaining the closest the current time and date signal from the system clock means as appending to the sequence of the signal reflecting keystroke combinations stored in the stroke record memory means in response to a control keystroke from the court reporter, for searching the recording of the video and audio signals to find the closest the current time and date signal from the system clock means as appending thereto, and for positioning the recording of the video and audio signals in the recorder mean with the closest the current time and date signal from the system clock means as appending thereto positioned for playback whereby the court reporter can automatically position the recording of the video and audio signals in the recorder means for coordinated checking of the keystroke combinations stored in the stroke record memory means with the corresponding recorded testimony.

For increased interest of the produced video record, there is additionally position control means for changing the scene being viewed by the video camera means between a first scene and a second scene and the control means includes means for causing the position control means to change the scene being viewed by the video camera means between the first scene and the second scene.

Figure 6:
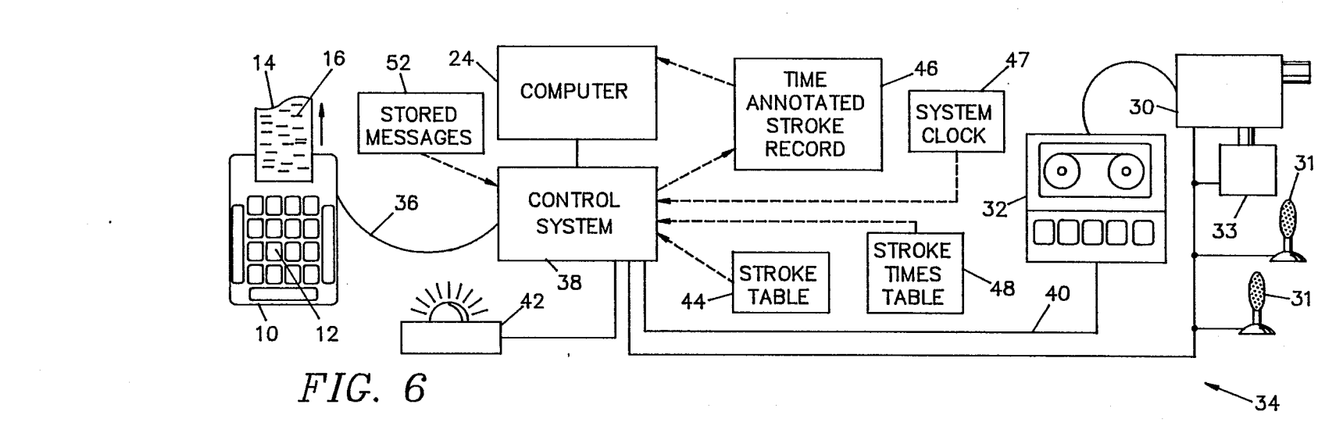
FIG. 6 is a drawing depicting a court reporting system according to the present invention in its preferred embodiment wherein the strokes input on the court reporter's stenographic machine are simultaneously input to a control system controlling a computer, video recording apparatus, and alarm apparatus whereby a coordinated document and video recording of the testimony is made under the complete control of the court reporter.

DESCRIPTION OF THE PREFERRED EMBODIMENT:

The court reporting system of the present invention in its preferred embodiment is shown in FIG. 6 wherein it is generally indicated as 34. There is a standard court reporter's stenographic machine 10 of type providing the strokes as input on an output line 36. The heart of the system 34 is the control system 38 which is shown connected to a computer 24. In the drawing, the control system 38 is indicated as a separate entity, and may in fact be implemented as such. As those skilled in the art will readily appreciate, the control system 38 may be incorporated into the computer 24 and it is anticipated by the inventor herein that in commercial embodiments such will be the case with so-called "portable" computers becoming smaller and faster. The VCR 32 and camera position controller 33 are connected by cable 40 to the control system 38 to be controlled thereby. As those skilled in the art will recognize, if desired, the cable 40 could be replaced by an infrared or radio frequency link for wireless operation. Such techniques, while they would eliminate wires in the area, would, unfortunately, also add to the cost of the system. As will be seen from the description hereinafter, the VCR 32 also receives audio and/or video inputs from and provides a feedback signal to the control system 38. As those skilled in the art will appreciate, the VCR 32, video camera 30, and microphones 31 could, of course, be replaced by a so-called "cam-corder" combining both functions into one piece of equipment. As those skilled in the art will appreciate from the description herein, such an equipment substitution would limit some of the preferred functions, however. Finally, in the preferred embodiment, the control system 38 is operably connected to a light alarm 42 whereby the participants can be alerted in a subdued manner to adverse conditions in the testimony as detected by the control system 38. A soft bell, or the like, could, of course, be used in lieu of or in combination with the light alarm 42.

Figure 7:
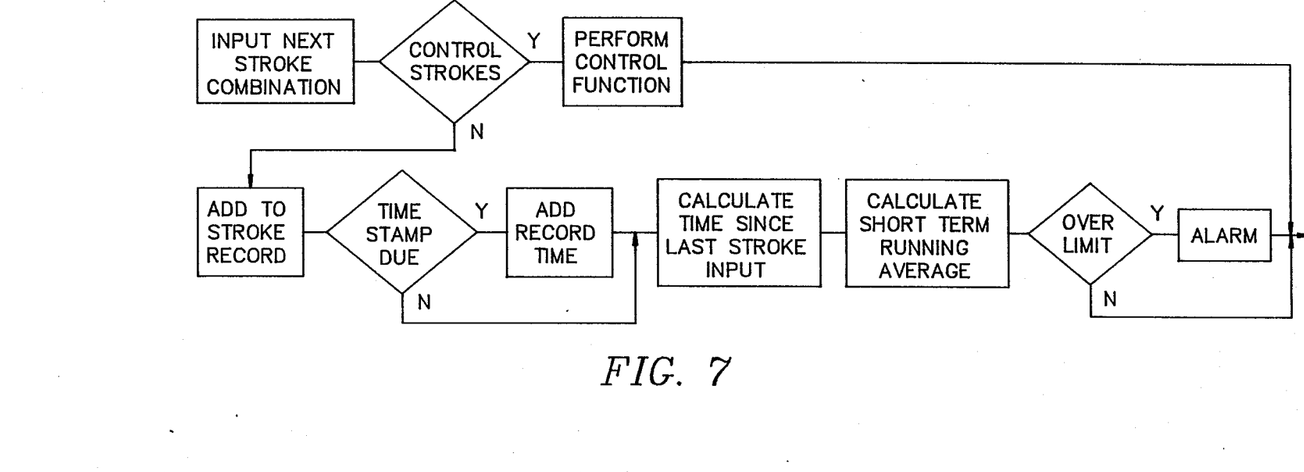
FIG. 7 is a flowchart depicting the basic logic implemented by the control system of the present invention.

Turning now to the logic flowchart of FIG. 7 in combination with the functional block diagram of FIG. 6 the general logic of the control system 38 will now be discussed in detail. As each stroke combination is read in by the control system 38 on line 36, the logic accesses a pre-defined stroke table 44. As is convenient to the purposes and objects of the present invention, all possible combinations of the buttons 12 are not employed in the phonetic recording and transcription process. Thus, there are combinations that are available for control purposes. Selected ones of these available combinations are pre-defined in the stroke table 44 for control purposes. Thus, the logic first checks each stroke against the contents of the stroke table 44 to determine if the stroke just input is a control stroke or not. If it is, the associated control function is executed The possible control functions as contemplated for the present invention in its preferred embodiment will be discussed in detail shortly. For the present, it is sufficient to note that the first thing the logic of the control does is to separate the control strokes from the non-control strokes.

All non-control strokes are added to the of the time annotated stroke record 46 maintained in computer memory for access by the computer 24. The logic then checks to see if it is time to time-stamp the stroke record 46; that is, an elapsed time (or counter position as fed back from the VCR 32) or the present time from a system clock 47 is periodically entered as part of the stroke record 46. The time stamp is overlooked by the computer 24 when using the stroke record 46 to prepare a draft of the transcribed record in word processing format for editing; but, is employed when automated searching of the video record coordinated to the stroke record 46 is undertaken. The logic then calculates the time since the last stroke input. This can be accomplished by accessing the real-time clock counter generally available in most computers 24. The logic then enters the time between the last stokes into a rotary stroke times table 48 which maintains the times between the last "n" strokes for a short term interval of, for example, 2-5 seconds. This prevents making decisions on instantaneous common stroke grouping, which can take place very rapidly without potential of errors. The logic then checks to see if the short term running average is over a pre-established limit as input for the particular court reporter operating the stenographic machine 10. The limit for each court reporter is chosen to be at a level where sustained operation at the level indicates that the court reporter's capacity for continued accurate recording is being exceeded such that the parties need to slow down in order to preserve an accurate record. When the limit is exceeded, the logic activates the light alarm 42 which blinks on and off several times a second to tactfully and impartially alert the parties to the situation.

Figure 8:
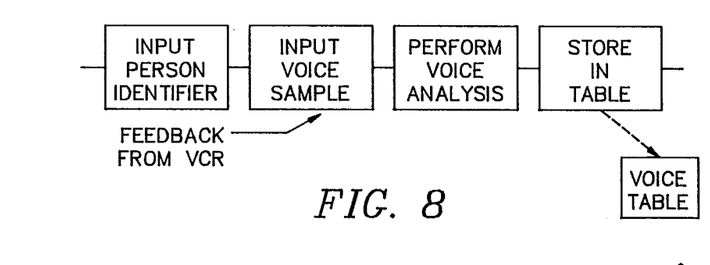
FIG. 8 is a flowchart depicting the basic steps in parameterizing a voice recognition system as optionally employed in the present invention.
Figure 9:
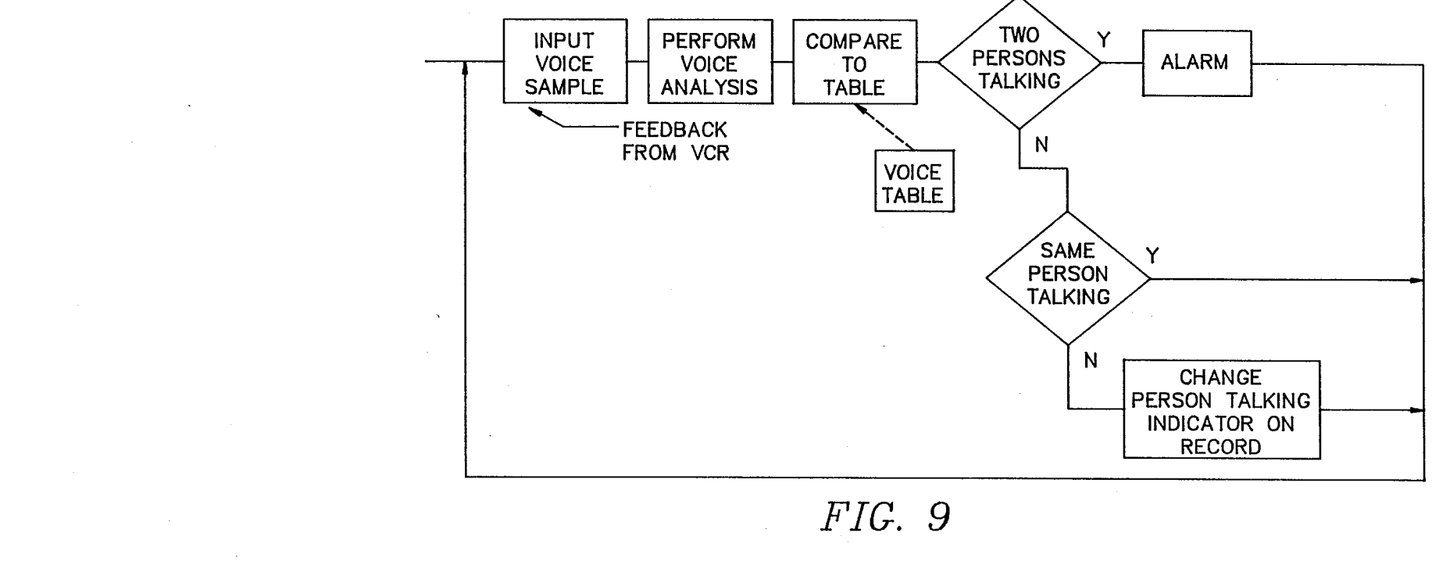
FIG. 9 is a flowchart depicting the steps in alarming when more than one person is talking at a time as employed in the present invention.

Turning now to FIGS. 8 and 9, the logic is shown therein for a feature may, optionally, be included in a future possible embodiment of the present invention — voice recognition. This is well within the developing state of the art and the speed of modern personal computers and, therefore, may be employed for two purposes. First, to allow the automatic indication, on the record, of the person speaking at any time thus removing this chore from the duties of the court reporter. Second, to check for multiple speakers and provide an alarm condition to the parties as in the case of too rapid speaking. As shown in FIG. 8, the logic includes initialization logic whereby the participants to the recording session are "introduced" to the system 34 of the present invention. This takes place prior to testimony beginning or whenever a new person enters the proceedings. The court reporter first enters a unique stoke identifying the person and the person recites a given phrase as provided by the court reporter beforehand. The logic inputs a sample of the recitation from the VCR 32 as detected by the video camera 30 and uses that sample to perform a voice analysis according to techniques well known in the art so as to develop easily recognized patterns to the person's voice. Those patterns are then stored in a voice table 50 indexed by the person's identifier.

During testimony, the logic loop shown in FIG. 9 runs continuously (but not exclusively) inputting voice samples from the VCR. It performs the same voice analysis on the samples to derive their characteristics and then compares the characteristics as sampled to the characteristics for the identified speakers. If it finds two (or more) persons speaking simultaneously, it activates the light alarm and returns to the beginning of the loop. If only one person is speaking, it checks to see if it is the same person as before and returns to the beginning of the loop without doing more if it is. If not, it changes the person talking indicator on the stroke record 46 before returning to the beginning of the loop.

The preferred approach to the above-described two functions is the use of multiple directional microphones 31 as shown in FIG. 6 where the microphones 31 are associated with individual persons or individual voice group sources. The logic employed with this approach is substantially identical to that of FIG. 9 as described above except that voice recognition techniques do not have to be applied to determine the source of one or more "voices". Such a determination is automatic as a function of which microphone 31 is detecting the sound. For that reason and in the interest of simplicity and the avoidance of redundancy, the logic of using multiple directional microphones 31 will not be described in detail further.

Another control aspect of the present invention in its preferred embodiment is the positional control and control of the zoom aspects of the camera 30. To provide a non-boring record of a deposition, or the like, it is recommended that the scene being viewed and the zoom aspects of the scene be changed periodically. For this purpose, the camera 30 is mounted on positional control apparatus 33 which allows the control system 38 to change the scene being viewed by moving the camera horizontally and up and down. Since the court reporter must be able to perform the primary function of making a written record of the testimony, the is no time or ability to pay more than minimum attention to the position of the camera 30. Accordingly, in the preferred embodiment, the control system 38 is pre-programmed by the court reporter prior to the beginning of the testimony to pre-define camera positions of interest. For example, one position could be with the camera 30 aimed at the person taking the testimony while another could be with the camera 30 aimed at the person giving the testimony. Having pre-defined the positions to be employed during the following testimony, the court reporter need only designate a position (manually or automatically) to have the camera go to that position with a minimum of input. Control strokes could be employed for each of the camera positions as well as zooming in and out of the camera 30. Such is not preferred, however. The preferred approach is to have the camera 30 move from position to position and zoom in and out on a pre-programmed time basis with manual override by the reporter through the use of stroke inputs. This assures an interesting record while, at the same time, also assuring that the camera is on the testifying party during critical testimony where it may be desirable at a later time to be able to demonstrate the testifying party's demeanor during the critical testimony. Another approach that could be employed is the switching of camera position as a function of the speaking party; that is, always recording the speaking party. For this purpose, it would be preferable to replace the single camera 30 and the positional control apparatus 33 with multiple cameras each aimed at a particular position and a switching apparatus controlled by the control system 38 as a function of the voice source to select its video input from one camera or the other.

Figures 10, 11:
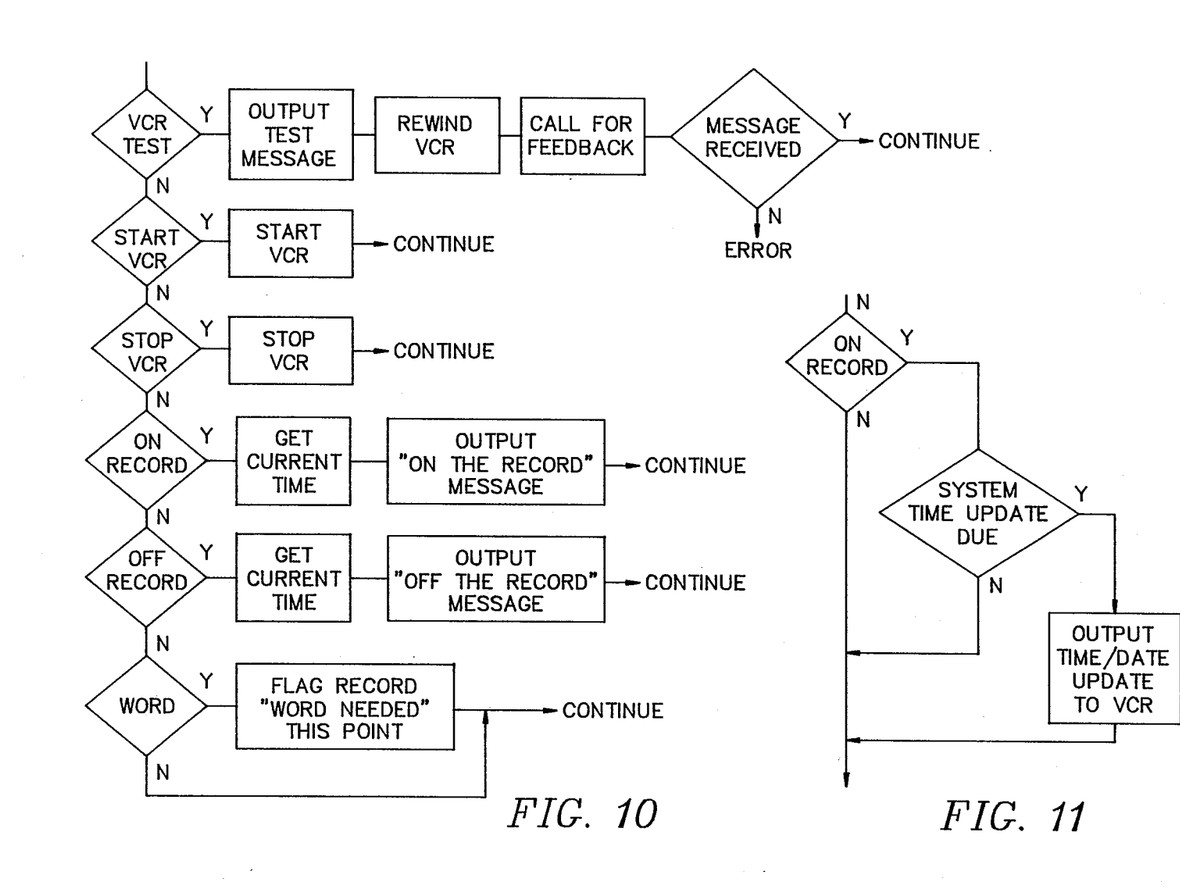
FIG. 10 is a flowchart depicting the basic control functions in the present invention.
FIG. 11 is a flowchart of the periodic time and date stamping function which takes place in the system of the present invention to keep the written and video records in synchronization.

While other control functions can be included as a need therefore is recognized in particular applications by merely defining them within the logic of the control system 38, those control functions contemplated as basic to a court reporting environment by the inventor herein are depicted in FIG. 10. If the court reporter calls for testing of the VCR to check its proper functioning, the logic outputs a test, synthesized voice message as stored in the table 52 (see FIG. 6), rewinds the VCR 32 to the point where the message should be recorded if the VCR 32 is working properly, calls for feedback from the VCR 32 (i.e. the playing of the tape), and checks to see if the message is played back. If it is, it continues. If not, it signals an error condition. If the court reporter calls for starting the VCR 32, the logic outputs a start command to the VCR 32. Likewise, if the court reporter calls for stopping the VCR 32, the logic outputs a stop command to the VCR 32.

The primary responsibility of the video operator in prior art video recording of testimony is saying "on the record at time . . ." when official testimony is taking place and saying "off the record at time . . ." when official testimony stops. In the present invention, these two functions are replaced by two stokes input by the court reporter. When on the record is input, the control system 38 outputs a synthesized voice message from the table 52 to the VCR 32 stating "on the record at time . . .". Similarly, when off the record is input, the control system 38 outputs a synthesized voice message from the table 52 to the VCR 32 stating "off the record at time . . .". If desired, the time and date can be superimposed continuously on the video recording from the information maintained within many video cameras for the purpose.

Finally, it is common as the court reporter is taking down the testimony in phonetic representation for the reporter to require the actual spelling of words prior to transcribing the stroke record. Typically, this can not be accomplished at the time of the testimony and is done by marking the paper tape 14 with pencil or pen or a marker key and then checking with the attorneys or witness at breaks or after the completion of the testimony. As with stopping and starting a recording device, it breaks the rhythm of the reporter to have to inject the physical marking of the paper tape 14. Thus, a word that should have been marked as questionable is often unmarked and transcribed on a best guess basis. The present invention provides an easy solution for that problem. When a questionable word occurs in the testimony, the reporter simply inputs a special stroke to flag the questionable word within the stroke record 46.

Turning now to FIG. 11, another continuous running loop within the logic of the control system in the preferred embodiment of the present invention is shown. At all times when the system is "on the record" and the VCR 32 is recording, the logic checks to see if it is time to update the system coordinating time. Periodically when it is, for example every five or ten seconds, the logic outputs a time and date marker from the system clock 47 to the VCR 32. This places the two recordings (written record and video) in time synchronization for later coordinated searching purposes.

Figure 12:
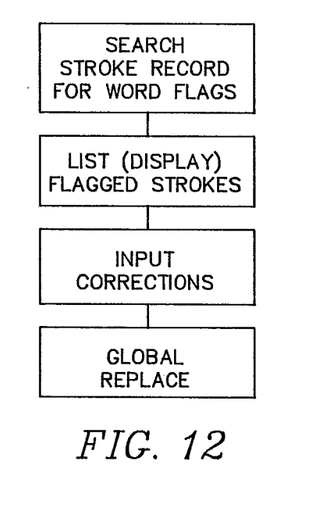
FIG. 12 is a flowchart depicting the steps of correcting words flagged for uncertainty during the recording process in the present invention.
Figure 13:
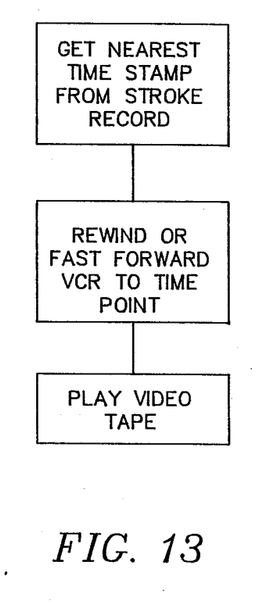
FIG. 13 is flowchart depicting the steps of placing the video recording in position with a point in the written record for verification playback in the present invention.

Two of the search functions incorporated into the editing functions of the system 34 in its preferred embodiment are depicted in FIGS. 12 and 13. During breaks or after the proceedings are completed (and before everyone leaves) the court reporter calls up the flagged word program shown in FIG. 12. In the preferred embodiment, the logic automatically generates an alarm to the court reporter as a reminder at any break or end time when there are unresolved flagged words. The flagged word program (running in the computer 24) searches the stroke record 46 for flagged words and lists (e.g. as described above for "questionable" words) and displays them. In the preferred embodiment, the flagged word and a portion of the text around it are displayed as in a word processor's spelling check routine so as to allow the questionable word to be considered in context. The correction of the word is input, and the system 34 then globally updates the stroke record 46 at all subsequent points where that stroke combination exists.

In similar fashion, when in the editing mode on the computer 24 and when requested at a questionable point in the testimony, the system 34 of the present invention includes the ability to get the nearest time stamp from the stroke record 34, rewind or fast forward the VCR to that point in time (as calculated from the time stamps periodically sent to the VCR as described above with additional consideration for any gaps between going off the record and back on the record), and play the video tape for the editing court reporter to review the questionable testimony once again.

Thus, it can be seen that the computerized court reporting system of the present invention has accomplished its desired objectives by providing a coordinated system under the complete control of a single court reporter which provides both a written and video record of testimony and which supports the reporter in the transcribing and editing functions.

Wherefore, having thus described my invention, what is claimed is:

1. A court reporting system for providing a simultaneous written and video record under the sole control of a single court reporter comprising:
   (a) a court reporter's stenographic recording input device having a keyboard for accepting phonetic keystroke combination manual inputs from the court reporter and for providing a corresponding signal reflecting keystroke combinations input by the court reporter at an output thereof;
   (b) system clock means for providing a current time and date signal at an output thereof;

(c) stroke record memory means for receiving and storing a sequence of said signal reflecting keystroke combinations input by the court reporter;

(d) a stroke definition table defining a plurality of keystroke combinations not employed for phonetic representations as control strokes;

(e) video camera means for viewing a scene and providing a video signal reflecting said scene at an output thereof;

(f) microphone means for providing an audio signal reflecting verbal testimony at an output thereof;

(g) recorder means connected to said outputs of said video camera means and said microphone means for producing a recording of said video and audio signals reflecting testimony in progress; and, (h) control means operably connected to said court reporter's stenographic recording input device, said system clock means, said video camera means, said microphone means, said stroke definition table, said recorder means, and said stroke recorder memory means for separating keystroke combinations input by the court reporter into phonetic keystrokes and control keystrokes, for controlling the operation of said video camera means and said recorder means as a function of recognized ones of said control keystrokes, for recording said phonetic keystrokes in said stroke record memory means, and for periodically obtaining said current time and date signal from said system clock means and appending it to said recording of said video and audio signals and said sequence of said signal reflecting keystroke combinations stored in said stroke record memory means.

2. The court reporting system of claim 1 and additionally comprising:

(a) alarm means for indicating an alarm condition;

(b) stroke times table means for maintaining a history of the times of the most recent strokes input by the court reporter; and, (c) said control means being operably connected to said stroke times table and said alarm means and including means for storing times of strokes input by the court reporter in said stroke times table, for periodically calculating a short term running average stroke speed of the court reporter, for comparing said short term running average stroke speed as calculated to an upper safe limit value, and for causing said alarm means to indicate an alarm condition when said short term running average stroke speed exceeds said upper safe limit value.

3. The court reporting system of claim 2 wherein:
said control means includes means for the court reporter to set said upper safe limit value.

4. The court reporting system of claim 2 wherein:
said alarm means comprises a blinking light.

5. The court reporting system of claim 1 and additionally comprising:

(a) alarm means for indicating an alarm condition; and, (b) said control means being operably connected to said alarm means and including means for determining if more than one person is speaking at a time during testimony and for causing said alarm means to indicate an alarm condition when more than one person is speaking at a time.

6. The court reporting system of claim 5 wherein:
said means for determining if more than one person is speaking at a time includes voice recognition means for identifying persons speaking from patterns associated with their voice as established prior to the taking of testimony.

7. The court reporting system of claim 5 wherein:

(a) said microphone means comprises a plurality of directional microphones aimed at voice sources of persons; and, (b) said means for determining if more than one person is speaking at a time includes means for identifying persons speaking from the one of said directional microphones detecting said voice source of the person.

8. The court reporting system of claim 1 and additionally comprising:

(a) message storage means for storing synthesized messages; and, (b) said control means being operably connected to said message means and including means for appending said synthesized messages to said recording of said video and audio signals.

9. The court reporting system of claim 1 and additionally comprising:

(a) message storage means for storing synthesized messages; and, (b) said control means being operably connected to said message means and including means for appending a first said synthesized message including said current time and date signal from said system clock means to said recording of said video and audio signals in response to a control keystroke from the court reporter indicating the time and date the testimony is going "on the record" and for appending a second said synthesized message including said current time and date signal from said system clock means to said recording of said video and audio signals in response to another control keystroke from the court reporter indicating the time and date the testimony is going "off the record".

10. The court reporting system of claim 1 and additionally comprising:
said control means including means for appending a flag to said phonetic keystrokes in said stroke record memory means in response to a control keystroke from the court reporter indicating a word as just recorded phonetically needs clarification, for searching said stroke record memory means for flags when requested by the court reporter, for displaying flagged ones of said phonetic keystrokes in said stroke record memory, for receiving clarification inputs from the court reporter, and for correcting said flagged ones of said phonetic keystrokes in said stroke record memory with said clarification inputs from the court reporter.

11. The court reporting system of claim 10 and additionally comprising:
said control means including means for automatically searching said stroke record memory means for flags at the end of a recording session and for advising the court reporter that there are words needing clarification if any said flags are found.

12. The court reporting system of claim 1 and additionally comprising:
said control means including means for obtaining the closest said current time and date signal from said system clock means as appending to said sequence of said signal reflecting keystroke combinations stored in said stroke record memory means in response to a control keystroke from the court reporter, for searching said recording of said video and audio signals to find the closest said current time and date signal from said system clock means as appending thereto, and for positioning said recording of said video and audio signals in said recorder mean with the closest said current time and date signal from said system clock means as appending thereto positioned for playback whereby the court reporter can automatically position said recording of said video and audio signals in said recorder means for coordinated checking of said keystroke combinations stored in said stroke record memory means with the corresponding recorded testimony.

13. The court reporting system of claim 1 and additionally comprising:
   (a) position control means for changing the said scene being viewed by said video camera means between a first scene and a second scene; and,
   (b) said control means being operably connected to said position control means and including means for causing said position control means to change the said scene being viewed by said video camera means between said first scene and said second scene.

14. The court reporting system of claim 13 wherein:
   (a) said video camera means comprises a first video camera and a second video camera; and,
   (b) said position control means comprises switching means for switching between said first video camera and said second video camera.

15. The court reporting system of claim 13 wherein:
   (a) said video camera means includes a zoom lens for zooming in and out between said first scene and said second scene; and,
   (b) said position control means comprises means for zooming said zoom lens in and out between said first scene and said second scene.

16. A court reporting system for providing a simultaneous written and video record under the sole control of a single court reporter comprising:
   (a) a court reporter's stenographic recording input device having a keyboard for accepting phonetic keystroke combination manual inputs from the court reporter and for providing a corresponding signal reflecting keystroke combinations input by the court reporter at an output thereof;
   (b) system clock means for providing a current time and date signal at an output thereof;
   (c) stroke record memory means for receiving and storing a sequence of said signal reflecting keystroke combinations input by the court reporter;
   (d) a stroke definition table defining a plurality of keystroke combinations not employed for phonetic representations as control strokes;
   (e) video camera means for viewing a scene and providing a video signal reflecting said scene at an output thereof;
   (f) microphone means for providing an audio signal reflecting verbal testimony at an output thereof;
   (g) recorder means connected to said outputs of said video camera means and said microphone means for producing a recording of said video and audio signals reflecting testimony in progress;
   (h) alarm means for indicating an alarm condition;
   (i) stroke times table means for maintaining a history of the times of the most recent strokes input by the court reporter; and,
   (j) control means operably connected to said court reporter's stenographic recording input device, said system clock means, said video camera means, said microphone means, said stroke definition table, said recorder means, said stroke record memory means, said stroke times table, and said alarm means for separating keystroke combinations input by the court reporter into phonetic keystrokes and control keystrokes, for controlling the operation of said video camera means and said recorder means as a function of recognized ones of said control keystrokes, for recording said phonetic keystrokes in said stroke record memory means, for periodically obtaining said current time and date signal from said system clock means and appending it to said recording of said video and audio signals and said sequence of said signal reflecting keystroke combinations stored in said stroke record memory means, for storing the times of the strokes input by the court reporter in said stroke times table, for periodically calculating a short term running average stroke speed of the court reporter, for comparing said short term running average stroke speed as calculated to an upper safe limit value, and for causing said alarm means to indicate an alarm condition when said short term running average stroke speed exceeds said upper safe limit value, for determining if more than one person is speaking at a time during testimony and for causing said alarm means to indicate an alarm condition when more than one person is speaking at a time, for appending a flag to said phonetic keystrokes in said stroke record memory means in response to a control keystroke from the court reporter indicating a word as just recorded phonetically needs clarification, for searching said stroke record memory means for flags when requested by the court reporter, for displaying flagged ones of said phonetic keystrokes in said stroke record memory, for receiving clarification inputs from eh court reporter, and for correcting said flagged ones of said phonetic keystrokes in said stroke record memory with said clarification inputs from the court reporter, and for obtaining the closest said current time and date signal from said system clock means as appending to said sequence of said signal reflecting keystroke from the court reporter, for searching said recording of said video and audio signals to find the closest said current time and date signal from said system clock means as appending thereto, and for positioning said recording of said video and audio signals in said recorder mean with the closest said current time and date signal from said system clock means as appending thereto positioned for playback whereby the court reporter can automatically position said recording of said video and audio signals in said recorder means for coordinated checking of said keystroke combinations stored in said stroke record memory means with the corresponding testimony.

17. The court reporting system of claim 16 wherein: said control means includes means for the court reporter to set said upper safe limit value.

18. The court reporting system of claim 16 wherein: said alarm means comprises a blinking light.

19. The court reporting system of claim 16 wherein:
(a) said microphone means comprises a plurality of directional microphones aimed at voice sources of persons; and,
(b) said means for determining if more than one person is speaking at a time includes means for identifying persons speaking from the one of said directional microphones detecting said voice source of the person.

20. The court reporting system of claim 16 and additionally comprising:
(a) message storage means for storing synthesized messages; and,
(b) said control means being operably connected to said message means and including means for appending said synthesized messages to said recording of said video and audio signals.

21. The court reporting system of claim 16 and additionally comprising:
(a) message storage means for storing synthesized messages; and,
(b) said control means being operably connected to said message means and including means for appending a first said synthesized message including said current time and date signal from said system clock means to said recording of said video and audio signals in response to a control keystroke from the court reporter indicating the time and date the testimony is going "on the record" and for appending a second said synthesized message including said current time and date signal from said system clock means to said recording of said video and audio signals in response to another control keystroke from the court reporter indicating the time and date the testimony is going "off the record".

22. The court reporting system of claim 21 and additionally comprising:
said control means including means for automatically searching said stroke record memory means for flags at the end of a recording session and for advising the court reporter that there are words needing clarification if any said flags are found.

23. The court reporting system of claim 16 and additionally comprising:
(a) position control means for changing the said scene being viewed by said video camera means between a first scene and a second scene; and,
(b) said control means being operably connected to said position control means and including means for causing said position control means to change the said scene being viewed by said video camera means between said first scene and said second scene.

24. The court reporting system of claim 23 wherein:
(a) said video camera means comprises a first video camera and a second video camera; and,
(b) said position control means comprises switching means for switching between said first video camera and said second video camera.

25. The court reporting system of claim 23 wherein:
(a) said video camera means includes a zoom lens for zooming in and out between said first scene and said second scene; and,
(b) said position control means comprises means for zooming said zoom lens in and out between said first scene and said second scene.

* * * * *